United States Patent
Wu

(10) Patent No.: US 7,524,806 B2
(45) Date of Patent: Apr. 28, 2009

(54) TRANS-1, 2-DICHLOROETHYLENE AND HYDROFLUOROCARBON OR ALKOXY PERFLUOROALKANE COMPOSITIONS HAVING ELEVATED FLASH POINTS

(75) Inventor: Jinhuang Wu, Norristown, PA (US)

(73) Assignee: Arkema Inc., Philadelphia, PA (US)

( * ) Notice: Subject to any disclaimer, the term of this patent is extended or adjusted under 35 U.S.C. 154(b) by 629 days.

(21) Appl. No.: 11/176,481

(22) Filed: Jul. 7, 2005

(65) Prior Publication Data

US 2007/0010421 A1 Jan. 11, 2007

(51) Int. Cl.
*C11D 7/50* (2006.01)
(52) U.S. Cl. ............... 510/412; 510/410; 510/411; 134/40
(58) Field of Classification Search .......... 510/410, 510/411, 412; 134/40
See application file for complete search history.

(56) References Cited

U.S. PATENT DOCUMENTS

| | | | |
|---|---|---|---|
| 5,037,572 A | 8/1991 | Merchant | |
| 5,064,560 A | 11/1991 | Merchant | |
| 5,196,137 A | 3/1993 | Merchant | |
| 5,759,986 A | 6/1998 | Merchant et al. | |
| 5,827,446 A | 10/1998 | Merchant et al. | |
| 5,827,812 A | 10/1998 | Flynn et al. | |
| 5,851,436 A | 12/1998 | Merchant et al. | |
| 5,925,611 A | 7/1999 | Flynn et al. | |
| 5,977,237 A | 11/1999 | Shin et al. | |
| 6,274,543 B1 | 8/2001 | Milbrath et al. | |
| 6,291,417 B1 | 9/2001 | Flynn et al. | |
| 6,319,970 B1 | 11/2001 | Shin et al. | |
| 6,472,444 B1 | 10/2002 | Harris et al. | |
| 6,689,734 B2 * | 2/2004 | Doyel et al. | 510/410 |
| 6,699,829 B2 * | 3/2004 | Doyel et al. | 510/410 |
| 6,746,998 B2 * | 6/2004 | Fitzgerald | 510/410 |
| 6,770,614 B2 | 8/2004 | Miller et al. | |
| 6,793,840 B2 | 9/2004 | Shin et al. | |
| 6,852,684 B1 | 2/2005 | Westbrook et al. | |
| 6,896,823 B2 | 5/2005 | Hitters et al. | |
| 7,288,511 B2 * | 10/2007 | Doyel et al. | 510/412 |
| 2003/0220218 A1 * | 11/2003 | Fitzgerald | 510/407 |
| 2003/0228997 A1 * | 12/2003 | Doyel et al. | 510/410 |
| 2004/0167053 A1 | 8/2004 | Knopeck et al. | |
| 2004/0171510 A1 * | 9/2004 | Minor et al. | 510/410 |
| 2004/0224870 A1 * | 11/2004 | Doyel et al. | 510/412 |
| 2005/0267006 A1 * | 12/2005 | Minor et al. | 510/411 |
| 2005/0269549 A1 * | 12/2005 | Wu | 252/182.24 |
| 2007/0203045 A1 * | 8/2007 | Schweitzer et al. | 510/411 |
| 2007/0203046 A1 * | 8/2007 | Minor et al. | 510/411 |
| 2008/0060687 A1 * | 3/2008 | Schweitzer et al. | 134/40 |

FOREIGN PATENT DOCUMENTS

| | | |
|---|---|---|
| GB | 2338960 | 6/1998 |
| JP | 06234998 | 2/1993 |
| JP | 11209798 | 8/1999 |

\* cited by examiner

*Primary Examiner*—Gregory E Webb
(74) *Attorney, Agent, or Firm*—Steven D. Boyd

(57) ABSTRACT

A tran-1,2-dichloroethylene blend which comprises a combination of a major amount of tran-1,2-dichloroethylene and a minor amount of a hydrofluorocarbon or an alkoxy perfluoroalkane having an elevated flash point is disclosed. The combination exhibits a flash point significantly higher than trans-1,2-dichloroethylene alone while containing only a minor amount of the component exhibiting the high Global Warming Potential. The preferred hydrofluorocarbon is 1,1, 1,2,2,3,4,5,5,5-decafluoropentane or 3,3,4,4,5,5,6,6,6-nonafluoro-1-hexene and the preferred alkoxy perfluoroalkane is 1-(methoxy)nonafluorobutane.

3 Claims, No Drawings

TRANS-1, 2-DICHLOROETHYLENE AND HYDROFLUOROCARBON OR ALKOXY PERFLUOROALKANE COMPOSITIONS HAVING ELEVATED FLASH POINTS

FIELD OF THE INVENTION

The present invention relates to compositions of predominantly trans-1,2-dichloroethylene having an elevated flash point. More particularly, the present invention relates to tran-1,2-dichloroethylene in combination with a minor amount of a hydrofluorocarbon or alkoxy perfluoroalkanes wherein the combination exhibits a flash point significantly higher than that of trans-1,2-dichloroethylene alone.

BACKGROUND OF THE INVENTION

In the production of foams, including polyurethane, agents such as hydrochlorofluorocarbons (HCFCs), hydrofluorocarbons (HFCs) etc are employed as foaming agents. These materials also find use as cleaning agents or solvents and refrigerants. Various chemicals are included in foam or polyol premixes. These chemicals can include polyols, catalysts, surfactants, fire retardants, etc. Trans-1,2 dichloroethylene is a know agent employed in foam production and in cleaning agent, solvent and refrigerant applications.

Handling of Trans-1,2-dichloroethylene or trans-1,2-DCE is problematic because of its relatively low flash point of –12° C. Flash point as used herein relates to flash point as measured using a Setaflash "series 7" flash point tester. Current United States Department of Transportation regulations designate liquids having a flash point less of than 60° C. as flammable for transportation purposes. Thus, transportation of trans-1, 2-DCE such as for use in foam production is problematic.

Prior methods to provide "non-flammable" trans-1,2-DCE have focused on mixing it with a large quantity non-flammable compound having a volatility similar to trans-1,2-DCE. Alternative prior methods relied upon forming azeotrope blends of tran-1,2,-DCE and other components to suppress (raise) the flash point. For example Novec™ engineered fluid HFE-71DE available from Minnesota Mining and Manufacturing Co. comprises an azeotropic blend of trans-1,2-DCE and 1-(Methoxy)nonafluorobutane ($C_4 F_9 OCH_3$). The blend consists of 50% by weight of 1-(Methoxy)nonafluorobutane. This blend is non-flammable and has no flash point. Such prior methods resulted in adding an additional volatile compound or compounds to trans-1,2-DCE which compounds can become incorporated into the foam produced with the mixture. Similarly, a product (Vertrel® MCA) available from DuPont is an azeotropic blend consisting of about 62% by weight of 1,1,1,2,2,3,4,5,5,5-decafluoropentance (HFC-4310mee) and about 38% by weight of trans-1,2DCE.

U.S. Pat. No. 5,759,986 discloses an azeotropic or azeotropic like composition of 40 to 70% by weight 1,1,1,2,2,3, 4,5,5,5-decafluoropentance (HFC-4310mee), 15-50% trans-1,2-dichloroethylene, 1-25% cyclopentane and 1-10% methanol or 35-75% by weight HFC-4310mee, 10-50% trans-1,2-dichloroethylene and 5-25% cyclopentane. No specific mention is made of flash point or boiling point for the described azeotropic or azeotropic like composition. The use of significant proportions of volatile compounds such as HFC-4310mee, adds to the global warming potential (GWP) of the mixture. These results are undesirable.

U.S. Pat. No. 5,196,137 discloses an azeotropic mixture of 1,1,1,2,3,4,4,5,5,5-decafluoropentane (HFC-4310mee) and trans-1,2-dichloroethylene, cis-1,1-dichloroethylene or 1,1-dichloroethane. The disclosed azeotropic mixture of HFC4310mee and tran-1,2-DCE consists essentially of 58 to 68 weight percent HFC-4310mee and 32 to 42 weight percent trans-1,2-DCE. The use of a significant proportion of volatile compounds such as HFC-4310mee, adds to the global warming potential (GWP) of the mixture. These results are undesirable.

U.S. Pat. No. 5,827,812 discloses azeotope or azeotrope like compositions including a composition consisting essentially of about 25 to 83 weight percent trans-1,2-dichloroethylene and about 75 to 17 weight percent perfluorobutyl methyl ether. The use of a significant proportion of volatile compounds such as perfluorobutyl methyl ethers, adds to the global warming potential (GWP) of the mixture. These results are undesirable.

U.S. Pat. No. 6,793,840 discloses a binary azeotropic composition of 3,3,4,4,5,5,6,6,6-nonafluoro-1-hexene and trans-1,2-dichloroethylene, which consists of 30.7 mole % of 3,3, 4,4,5,5,6,6,6-nonafluoro-1-hexene and 69.3 mole % of trans-1,2-dichloroethylene. This composition is equivalent to 52.9% by weight of 3,3,4,4,5,5,6,6,6-nonafluoro-1-hexene.

BRIEF SUMMARY OF THE INVENTION

Compositions comprising as a major portion trans-1,2-DCE having a suppressed or elevated flash point are provided. The compositions allow for easier and safer handling and transportation of trans-1,2-DCE for use such as in foam production, cleaning/solvent applications, refrigerant applications etc. In addition, the compositions have lower global warming potential than those azeotropic blends, which consist of a large percentage of high global warming potential substances such as 1,1,1,2,2,3,4,5,5,5-decafluoropentance or 1-(Methoxy)nonafluorobutane. The compositions comprise a minor amount of one or more saturated or unsaturated hydrofluorocarbons or alkoxy perfluoroalkanes and a major amount of trans-1,2-DCE. It was discovered that such compositions exhibit a flash point significantly higher than trans-1,2-DCE alone. Preferred hydroflourocarbons include 1,1,1,2,2,3,4,5, 5,5-decafluoropentane (HFC-4310mee), 3,3,4,4,5,5,6,6,6-nonafluoro-1-hexene and preferred alkoxy perfluoroalkanes include 1-methoxy nonafluorobutane (HFE-7100). Flash points of greater than 48° C. (the boiling point of pure trans-1,2-DCE) or higher are possible with the addition of only minor amounts of such hydrofluorocarbons or alkoxy perfluoroalkanes to trans-1,2-DCE.

DETAILED DESCRIPTION

It has been discovered that the flash point of trans-1,2-DCE can be suppressed or elevated above 48° C. (the boiling point of pure trans-1,2DCE) by mixing trans-1,2-DCE with minor amounts of one or more saturated or unsaturated hydrofluorocarbons or alkoxy perfluoroalkanes. The amount of hydrofluorocarbons or alkoxy perfluoroalkanes added to trans-1,2-DCE to achieve the desired flash point higher than the flash point of tran-1,2-DCE alone is from about 3% to 5% by weight. Preferably the flash point of the blend is increased to higher than about 45° C. and more preferably 50° C. or above. Such a minor amount of hydrofluorocarbons or alkoxy perfluoroalkanes does not significantly impact the Global Warming Potential of the mixture because of such a minor amount of hydrofluorocarbon or alkoxy perfluoroalkanes is added.

Trans-1,2-DCE is an additive used in polyurethane foam production that provides processability enhancements, smoke generation suppression etc. The mixture of trans-1,2-DCE and a hydrofluorocarbon or alkoxy perfluoroalkane of the present invention, provides a means of transporting and handling trans-1,2-DCE in a less hazardous combination. The mixture is useful in the production of foams such as polyurethane foams as well as in cleaning agent/solvent applications and in refrigerant applications. The present invention provides a means for transporting and handling trans-1,2-DCE in a less hazardous, high flash point condition for such uses.

The present invention is illustrated in more detail in the following non-limiting examples.

EXAMPLES

The flash point measurements of trans-1,2DCE alone and in blends with HFC-4310mee, 3,3,4,4,5,5,6,6,6-nonafluoro-1-hexene or HFE-7100 were conducted using Setaflash "series 7" flash point tester available from Petroleum Systems Services Corporation.

The test was conducted according to ASTM D3828-02 "Standard Test Method for Flash Point by Small Scale Closed Cup Tester". The equilibrium mode was used to obtain the flash point.

Example 1

The flash point of trans-1,2-DCE is −12° C. Blends of trans-1,2-DCE with HFC-4310mee exhibited increased flash points. The addition of minor amounts, from about 1 to 3 weight %, of HFC4310mee were discovered to increase the flash point of trans-1,2-DCE. Flash points of greater than 53° C. were realized. Table 1 summarizes the results.

TABLE 1

Flash Point of Trans-1,2DCE and HFC-4310mee Blends

| HFC-4310mee, wt % | Trans-1,2DCE, wt % | $T_{flash}$ (° C.) |
|---|---|---|
| 0 | 100 | −12 |
| 1 | 99 | −2 |
| 2 | 98 | >45 |
| 3 | 97 | >53* |

*test adjourned above this temperature because the test temperature is above boiling point of trans-1,2DCE and vapor causes flame around the cup.

HFC-4310mee or 1,1,1,2,2,3,4,5,5,5-decafluoropentane is a product available from DuPont.

Trans-1,2-dichloroethylene or trans-1,2DCE (99+%) is available from Arkema Inc.

Example 2

The flash point of trans-1,2-DCE is −12° C. Blends of trans-1,2-DCE with 3,3,4,4,5,5,6,6,6-nonafluoro-1-hexene exhibited increased flash points. The addition of minor amounts, about 3 weight %, of 3,3,4,4,5,5,6,6,6-nonafluoro-1-hexene were discovered to increase the flash point of trans-1,2-DCE. Flash points of greater than 60° C. were realized. Table 2 summarizes the results.

TABLE 2

Flash Point of Trans-1,2DCE and 3,3,4,4,5,5,6,6,6-nonafluoro-1-hexene Blends

| 3,3,4,4,5,5,6,6,6-nonafluoro-1-hexene, wt % | Trans-1,2DCE, wt % | $T_{flash}$ (° C.) |
|---|---|---|
| 0 | 100 | −12 |
| 3 | 97 | >60 |

3,3,4,4,5,5,6,6,6-nonafluoro-1-hexene is a product available from SynQuest

Trans-1,2-dichloroethylene or trans-1,2DCE (99+%) is available from Arkema Inc.

Example 3

The flash point of trans-1,2-DCE is −12° C. Blends of trans-1,2-DCE with HFE-7100 exhibited increased flash points. The addition of minor amounts, from about 3 to 5 weight %, of HFE-7100 were discovered to increase the flash point of trans-1,2DCE. Flash points of greater than 50° C. were realized. Table 3 summarizes the results.

TABLE 3

Flash Point of Trans-1,2DCE and HFE-7100 blends

| HFE-7100, wt % | Trans-1,2 DCE, wt % | $T_{flash}$ (° C.) |
|---|---|---|
| 0 | 100 | −12 |
| 3 | 97 | >50* |
| 5 | 95 | >52* |

*test adjourned above this temperature because the test temperature is above boiling point of trans-1,2DCE and vapor causes flame around the cup.

HFE-7100 or 1-(Methoxy)nonafluorobutane is a product available from SynQuest Laboratories, Inc.

Trans-1,2-dichloroethylene or trans-1,2DCE (99+%) is available from Arkema Inc.

While the present invention has been described with respect to particular embodiments thereof, it is apparent that numerous other forms and modifications of this invention will be obvious to those skilled in the art. The appended claims and this invention generally should be construed to cover all such obvious forms and modifications which are within the true spirit and scope of the present invention.

What is claimed is:

1. A composition comprising from about 95% to about 99% by weight tran-1,2-dichloroethylene and from about 1% to about 5% by weight a 3,3,4,4,5,5,6,6,6-nonafluoro-1-hexene.

2. The composition of claim 1 having a flash point above about 45° C.

3. The composition of claim 1 having a flash point above about 50° C.

* * * * *